United States Patent [19]

Heublein

[11] 4,305,985
[45] Dec. 15, 1981

[54] WALL COVERING MATERIAL

[75] Inventor: Walter Heublein, Sempach-Stadt, Switzerland

[73] Assignee: Ebnother AG Sempach-Station, Sempach-Station, Switzerland

[21] Appl. No.: 144,776

[22] Filed: Apr. 28, 1980

[30] Foreign Application Priority Data

May 29, 1979 [CH] Switzerland .................. 4977/79

[51] Int. Cl.³ .................. B32B 5/04; B32B 5/16; B32B 5/18; B32B 5/22
[52] U.S. Cl. .................. 428/87; 428/91; 428/283; 428/290; 428/328; 428/329; 428/920; 428/921; 428/313.9; 428/305.5
[58] Field of Search .......... 428/310, 315, 306, 308, 428/309, 311, 920, 323, 325, 328, 329, 921, 91, 87, 283, 290

[56] References Cited
U.S. PATENT DOCUMENTS

| 3,515,625 | 6/1970 | Sedlak et al. | 428/315 |
| 4,016,326 | 4/1977 | Schaefer | 428/306 |
| 4,025,686 | 5/1977 | Zion | 428/310 |
| 4,039,709 | 8/1977 | Newman | 428/159 |
| 4,101,050 | 7/1978 | Buckler et al. | 428/310 |

FOREIGN PATENT DOCUMENTS 587119  4/1977  Switzerland .................. 428/310

Primary Examiner—William J. Van Balen
Attorney, Agent, or Firm—Werner W. Kleeman

[57] ABSTRACT

A wall covering material comprising a front, decorative filled cover layer containing textile fibers and a rear foam plastic layer. The foam plastic layer contains flame-retarding additives, is elastic and gas pervious. Furthermore, it contains closed cell inorganic hollow spheres or small balls, which rigidify or stiffen the foam plastic layer, but do not unduly impair its restoring capability and also do not impair the insulation capability, sound absorption capability and flame resistance.

11 Claims, 1 Drawing Figure

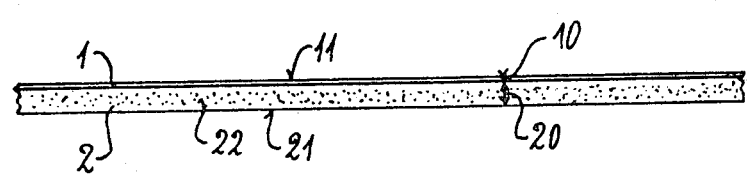

WALL COVERING MATERIAL

BACKGROUND OF THE INVENTION

The present invention relates to a new and improved construction of wall covering material containing at its rear face an elastic, gas pervious foam plastic layer containing flame-retarding additives and confronting, during use of the wall covering material, the wall which is to be covered, and further embodies a cover layer at its front face which, during use, faces the viewer of the wall covering material and contains fibers. The entire heat composite possesses heat insulating, sound absorbing and flame-retarding properties. In particular, the wall covering material is essentially a predominantly flat structure which can be applied to a wall in the manner of wallpaper.

Insulation materials which are suitable as wall coverings, for instance styrene foams, indeed possess a limited decorative effect, for instance by structuring the same, but no flame-retarding properties. Generally, they require further finishing, for instance by coating or tapestrying. As a rule, however, such does not tend to eliminate the pressure sensitivity of the aforementioned insulating materials, and therefore apart from the previously discussed operations which are complicated and time-consuming, it is necessary to resort to other protective measures.

Other insulating materials, which do have flame-retarding properties, such as rockwool, do not however have any decorative effect.

Decorative materials, for instance carpets, which also have a certain degree of insulation capability, are not adequately flame inhibiting, and furthermore, they are expensive so that they only can be used in exceptional instances.

In Swiss Pat. No. 587,119 there is disclosed a wall covering material which possesses at its rear face, confronting the wall to be covered during use, a foam plastic layer containing flame-retarding additives and at its front face, which confronts the observer during use, a decorative cover layer containing textile fibers. The entire wall covering material or composite possesses heat insulating, sound absorbing, flame-retarding and decorative properties. The foam plastic layer should have an extensive, cellular or expanded rubber-like restoring capability in order to reduce the pressure or compression sensitivity. To render possible breathing of the wall, the entire wall covering material should be gas pervious.

However, such wall covering material is afflicted with the drawback that, owing to its elastic foam plastic layer, there can be formed unsteady joints and drawn-in joints, if the elastic foam plastic layer is relatively soft. Therefore, it is desirable if the foam plastic layer possesses a certain rigidity, which only however can be obtained by increasing the content of filler material, if the material still should have pressure or compression sensitivity. This increase in the filler material or filler is however associated with the disadvantage that there is reduced the quantity of air which is encapsulated in the aerated or foam plastics, which, in turn, appreciably reduces the insulating properties.

SUMMARY OF THE INVENTION

Therefore, with the foregoing in mind it is a primary object of the present invention to provide a new and improved construction of wall covering material which is not afflicted with the aforementioned drawbacks and limitations of the prior art proposals.

Another and more specific object of the present invention aims at providing a new and improved construction of wall covering material which, just like the last above discussed state-of-the-art material, can be fabricated so as to possess insulating, sound absorbing, flame-retarding and decorative properties and can be produced with low cost and expenditure and is available at a relatively low cost in relation to the intended general field of use, but furthermore can be layed in a simple manner and with clean joints, without impairment of the insulation property thereof.

Now in order to implement these and still further objects of the invention which will become more readily apparent as the description proceeds, the wall covering material of the present development is manifested by the features that hollow spherical-like granules formed of inorganic material and possessing closed cells are provided in an open cell foam plastic of the foam plastic layer.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE schematically shows in side fragmentary view a wall covering material formed according to the teachings of the invention.

DETAILED DESCRIPTION OF THE PREFERRED EMBODIMENTS

Describing now the invention, as explained above, a preferred exemplary embodiment of wall covering material according to the invention comprises at its front face which, during use, confronts the observer, a cover layer 1 containing fibers and at its rear face, which during use confronts the wall or other structure to be covered, an elastic, gas pervious foam plastic layer 2 which contains flame-inhibiting or flame-retarding additives. The foam plastic layer 2 contains an open cell foam plastic material which, according to the invention, is provided with hollow spherical-like granules 22 formed of inorganic material and containing closed cells.

The granules, schematically illustrated by reference character 22, containing closed cells can particularly consist of glass and $CaSiO_4$. The diameter of the grains is preferably in a range of $10\mu$ to $300\mu$.

Based upon the dry weight of the foam or aerated plastic layer 2 the granules 22 are present in an amount of up to 75% or even more.

These granules 22 which contain closed cells bring about a so-to-speak "stiffening" of the foam plastic layer 2, but however they do not reduce the insulation property.

Through the use of an open cell foam or aerated plastics there is also beneficially maintained the gas permeability.

The "rigid" foam plastic layer renders it possible to obtain clean joints upon laying of the wall covering material, but having sufficient rubber or elastomeric characteristics.

The desired properties of the foam plastic layer 2 can be particularly realized through the use of a vulcanized styrene-butadiene-rubber (SBR-latex), and such contains aluminum hydroxide therein serving as the flame-retarding additive. A suitable foam plastic layer should have a thickness of at least a few millimeters, so that it can better comply with the requirements concerning insulation property and sound absorbing property. However, in many instances it can also have a lesser thickness.

The aforementioned cover layer 1 can particularly consist of a web or fleece, and the decorative effect can be obtained by surface structuring and/or imparting a colored or dyed effect thereto, for instance by printing. Particularly suitable are polyester fiber webs or fleeces, especially spun webs formed of endless polyester fibers, which are entangled, slightly needled and impregnated. Such fleece or web should possess a sufficiently great weight per square meter, for instance exceeding 100 grams, and it should be so loose that it is not similar to paper to the extent possible. Such fleece can have a thickness in the order of magnitude of 1 millimeter, and it is advantageous if it possesses a rigidity or stiffness which is comparable to that of soft cardboard. Such fleece in combination with the previously discussed foam plastic produces ideal wall coverings, and the fleece itself can be structured, through the addition of suitable additives or through suitable selection of the fibers, to be flame-inhibiting or flame-resistant. Frequently, however, the flame resistance of the foam plastics is adequate, in order to enable a polyester fleece to likewise appear adequately flame-resistant.

With the aforementioned polyester fleeces there are advantageously used fibers of 10 to 20$\mu$ diameter, because then the fleece, after an appropriate finishing operation, for instance after imprinting, not only has a particular textile appearance but especially also has a felt-like textile handle. Under the term "handle" as used herein, there is not to be understood the condition wherein a textile structure is tested by slightly crumbling it together in the fist of a user, but rather merely the handle which it has when the textile structure is tested by running the finger tips over the smooth product.

Of course, it is also possible to use as the cover layer 1 appropriate fabrics or woven structures, wherein glass fiber fabrics are of advantage when there are placed greater demands upon the flame repelling properties, and wherein with such glass fiber fabrics there can be easily realized the decorative effect by appropriate structuring of the fabric and a possible subsequent decorative application of dispersions. There also can be used the so-called pigment printing.

Continuing, the invention will now be explained by way of example on the basis of the following data:

A polyester fleece of the previously described type, having a thickness of about 1 mm with a weight per square meter in the order of magnitude of about 160 grams, is printed at one face or side such that there is obtained a non-fading or light resistant finished, fast to rubbing and wallpaper like washable surface having a textile characteristic.

This fleece is provided in a conventional piece of equipment at its rear face with a foam plastic material. This foam or aerated plastic material has the following composition:

| Material | Parts by weight |
| --- | --- |
| SBR latex (67%) | 600 |
| Polystyrene dispersion (50%) | 80 |
| Potassium oleate (18%) | 90 |
| Water | 20 |
| Conventional-Vulcanization paste (55%) | 60 |
| Aluminum silicate hollow spheres or balls ($\phi$ 10–75$\mu$) | 50 |
| Phenolic aging protective agent | 3.2 |
| Aluminum-oxide-hydrate | 50 |

As the hollow spheres or balls there can be beneficially employed commercially available hollow spheres, known under the trademark "Fillite" of Fillite (Runcorn) Ltd., Runcorn, Great Britain or those available commercially under the trademark "Armospheres" of Georg M. Langer & Co. Ritterhude/Bremen, West Germany. They are advantageously filled with $CO_2$ and nitrogen, which increases the flame resistance and heat insulation of the final product.

The aforementioned constituents of the composition are foamed in a conventional manner in a mixer and then applied through a static mixer at the rear face of the fleece 1, and before the static mixer there can be added as the gelling agent ammonium acetate or sodium silicofluoride. For accelerating the gelling action the foam plastic which is applied by means of a squeegee so as to have the desired thickness, together with the therebelow located fleece, is passed below an infrared radiation field, whereafter the outfed product is vulcanized in a throughpass oven. The foam also can be fabricated in a non-gel process, in which case in the above-described composition the potassium oleate is replaced by a synthetic soap, for instance the sodium salt of a sulfosuccinimate. The vulcanization operation is then carried out in conventional manner in a throughpass oven. The thus obtained foam plastic material having a thickness of, for instance 5 mm is rigidly bonded with the fleece or web or equivalent structure, possesses a high restoring capability, is soft in a cellular or expanded rubber-like manner and affords an ideal substrate for the adhesive bonding of the thus obtained composite or wall covering material at a wall or other structure.

The aluminum silicate-hollow balls or spheres serve as a reinforcing or stiffening filler, which retains the insulating effect or, in fact, even improves upon the same.

The hollow spheres can be filled with $CO_2$ and $N_2$, thus increasing the flame resistance and the insulating properties.

The aluminum oxide hydrate referred to in the above-mentioned composition, in the embodiment under discussion, serves to a certain extent as the filler and also as the flame-retarding agent.

Of course, a foam plastic material of the aforementioned type can be modified as to its composition, wherein, in particular, it is here also noted that the foam plastic material, as desired, can be dyed, although as a general rule when working with a fleece material of the aforementioned type the transparency of a white foam plastic material is not to be expected and also is not disturbing. A similar foam plastic composition can also be applied to a fabric or a woven structure, which can be decoratively configured by appropriate structuring and/or dying thereof, especially by printing its surface.

A particularly great flame inhibiting effect or flame resistance can be obtained if there is used as the cover layer a product which at least predominantly consists of glass fibers, and in this case there is likewise used fleece, but advantageously structured woven textile fabrics or structures. The surface of such a glass fiber product can particularly undergo a further decorative patterning effect by application of a so-called pigment printing process. However, it is also possible to apply flame-retarding dispersions.

As will be apparent from what has been discussed heretofore, it is possible to produce with simple means price worthy insulating and sound absorbing, flame-inhibiting or flame-retarding wall coverings having decorative effect, and which advantageously can be layed with clean joints.

As mentioned in the single accompanying Figure of the drawing there is shown in side view a portion of a wall covering fabricated according to the invention. The cover layer 1 which is particularly fabricated of a fleece of the previously disclosed type, has a thickness 10 amounting to about 1.1 mm. This cover layer 1 is intimately bonded or connected with a foam plastic layer 2, which is foamed at the rear face of the cover layer 1, gelled thereupon and vulcanized. The foam plastic layer 2, in turn, has a thickness in the order of magnitude of about 4 mm and an expanded rubber-like consistency. The relative smooth surface 11 of the cover layer 1 is provided with a suitable but not particularly shown printed pattern. It can additionally be structured, for instance by impregnation or in any other suitable manner, or it could only have such structuring without any printing. The rear face or side 21 of the foam plastic layer 2, in turn, is relatively smooth, so that the fine pores only can be perceived upon closer inspection. This is conductive for the adhesive bonding of the wall covering at a wall or the like for the reasons that the adhesive material or glue, possibly applied to the rear face or side 21, must, on the one hand, afford a good bond with the porous foam plastic layer 2, but not penetrate to such an extent into the foam plastic material that there is impaired its functionality. As previously likewise mentioned, the hollow granules embedded in the foam plastic layer 2 have been schematically represented by the individual points 22. The number of points 22, representing the hollow granules, is not to be considered as representative or to scale.

While there are shown and described present preferred embodiments of the invention, it is to be distinctly understood that the invention is not limited thereto, but may be otherwise variously embodied and practiced within the scope of the following claims. Accordingly,

What I claim is:

1. A wall covering material for covering a structure, such as a wall, comprising:

a fiber containing cover layer provided at a front face of the wall covering material, which, during use, confronts the viewer;

an elastic, gas pervious foam plastic layer provided at a rear face of the wall covering material which, during use, confronts the wall;

said foam plastic layer containing a foam plastic material comprising an open cell foam of a vulcanized product containing styrene-butadiene-rubber, and possesses a high restoring capability following deformation;

said foam plastic layer containing flame-retarding additives including hollow spherical-like granules formed of an inorganic material having closed cells which at least for the most part are filled with an inert gas; and said foam plastic layer containing the additives and said cover layer defining a composite possessing heat insulation, sound absorbing and flame-retarding properties.

2. The wall covering material as defined in claim 1, wherein:

said inert gas comprises at least in part nitrogen.

3. The wall covering material as defined in claim 1, wherein:

said inert gas comprises at least in part carbon dioxide.

4. The wall covering material as defined in claim 1, wherein:

said hollow spherical-like granules comprise hollow spheres having a grain size distribution in a range of about 10 to 300 microns.

5. The wall covering material as defined in claim 4, wherein:

said grain size distribution is in a range of about 10 to 75 microns.

6. The wall covering material as defined in claim 1, wherein:

said foam plastic layer contains aluminum oxide hydrate.

7. The wall covering material as defined in claim 1, wherein:

said cover layer comprises a fleece.

8. The wall covering material as defined in claim 7, wherein:

said fleece comprises a polyester fiber fleece.

9. The wall covering material as defined in claim 1, wherein:

said cover layer contains at least predominantly glass fibers.

10. The wall covering material as defined in claim 1, wherein:

said cover layer contains a glass fiber fabric.

11. The wall covering material as defined in claim 1, wherein:

said cover layer possesses a decorative surface.

* * * * *